April 19, 1932.　　　E. H. REMDE　　　1,855,068
INDUSTRIAL TRUCK
Filed Dec. 31, 1927　　5 Sheets-Sheet 1

Inventor
Edward H. Remde
By Geo. B. Pitts
Attorney

April 19, 1932.  E. H. REMDE  1,855,068
INDUSTRIAL TRUCK
Filed Dec. 31, 1927  5 Sheets-Sheet 2

Inventor
Edward H. Remde
By Geo. B. Pitts
Attorney

April 19, 1932.   E. H. REMDE   1,855,068
INDUSTRIAL TRUCK
Filed Dec. 31, 1927   5 Sheets-Sheet 3

Inventor
Edward H. Remde
By Geo. B. Pitts
Attorney

April 19, 1932.  E. H. REMDE  1,855,068
INDUSTRIAL TRUCK
Filed Dec. 31, 1927   5 Sheets-Sheet 4

Inventor
Edward H. Remde
Geo. B. Pitts
Attorney

Patented Apr. 19, 1932

1,855,068

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed December 31, 1927. Serial No. 243,885.

This invention relates to an industrial truck, more particularly a truck for picking up, transporting and discharging loads on the floor or on elevated supports or levels or on each other in piled arrangement.

One object of the invention is to construct a truck of this character capable by a single operation of engaging and picking up a body or load for transporting it, whereby labor and prior handling are eliminated and ease and speed of operation results.

Another object of the invention is to provide a truck of this character capable of readily engaging and picking up bodies resting directly on the floor or on elevated supports or on themselves and discharging the same, either on the floor, or on an elevated support or on other bodies.

A further object of the invention is to provide a truck capable of picking up or discharging bodies of different sizes and also picking up bodies supported at any one of several levels at will, and discharging same upon the floor or an elevated support.

Another object of the invention is to provide a truck of this character that is relatively simple in construction and readily operated to handle bodies rapidly and with minimum labor.

Other objects of the invention will be apparent to those skilled in the art to which my invention relates from the following description taken in connection with the accompanying drawings, wherein.

In the use of the word "body" herein I do not wish to be limited to any particular kind or shape of load that is to be picked up, transported and discharged, although I have for sake of one example shown bodies of cylindrical shape, such as relatively large rolls of paper A, since the mechanism for engaging and lifting a load and discharging it lends itself admirably for handling loads or bodies of this shape. My construction may be used for handling, in addition to rolls of paper, barrels, bales of materials, whether mounted directly on the floor surface or on cleats, runners (generally known as dunnage) or skids. Where the loads are mounted on cleats, runners, skids and the like, it may be used to handle variously shaped loads, including boxes, stacks of loose sheet materials and also sheet materials in bundles.

In the drawings, 1 indicates as an entirety a frame supported at its front or driving end on one wheel or a pair of wheels 2 and at its rear or load carrying end on wheels 3. It will be understood that either wheels 2 or 3 may be driven and that either wheels 2 or 3 or both may be movably mounted for steering purposes, whether such wheels be driven or not. In the present form of construction (a) I provide a pair of wheels 2 in dual relation mounted on suitable spindles $2a$ carried by a frame $2b$ having a vertical shaft or column suitably mounted in bearings in the frame 1, so that the wheels may be moved about the axis of the shaft for steering purposes and (b) the wheels 3 are driven by a motor 4 through a suitable axle driving mechanism, the motor 4 being connected to and supporting on an extended portion 5 of the housing 6 enclosing the axle driving mechanism.

The extended end 5 of the housing 6 is supported by a torque member 7, being preferably connected thereto by a universal joint, and the opposite ends of the torque member 7 are trunnioned on brackets 8 depending from the frame 1. The other end of the axle housing 6 is provided with journal boxes 9 which slidably fit opposing guides in castings 10 secured to the frame 1, coiled springs being interposed between the boxes and suitable seats (not shown) on the frame.

11 indicates a pair of uprights at and rigidly secured to the front end of the frame 1, the lower ends of the uprights carrying a support 12 on which is pivoted a platform 12a for the operative. 13 indicates a foot pedal associated with the platform 12a and arranged to control a suitable brake 14, normally biased to engage an element (such as a wheel or drum), which is connected to and driven by the shaft of the motor 4. 15 indicates a controller for the motor 4, the operating element of the controller being connected by a linkage with a handle or lever 16. 17 indicates the batteries, supported on the frame 1 and supplying electric current to the motor 4 and a motor 18 of a raising and lowering mechanism, indicated as an entirety at 19, to which reference will later be made. The batteries may be enclosed in a sheet metal casing.

20 indicates a steering device, such as a lever, connected to a column or shaft suitably supported by one of the uprights 11 and connected by a linkage to the frame 2b to effect steering of the wheels 2.

21 indicates an abutment arranged to serve as a stop for limiting the inward swinging movement of a guide frame 22, which is pivoted or trunnioned at or near its lower end on the frame 1, as will later appear. The abutment 21 preferably comprises a pair of vertically arranged channels 21a connected at their lower ends to the frame 1 and reinforced and braced by gussets 23 and tie members 24 connected in a suitable manner to the uprights 11 at their lower ends and at their upper ends to the channels 21a; each channel 21a and adjacent tie rod 24 being connected by a gusset 25 and the latter are connected and held in spaced relation by a rod 26, which serves as a shaft for a pair of sheaves 27, to be later referred to. The guide frame preferably comprises a pair of spaced channels each carrying at its lower end a rearwardly extending plate 28 formed with an opening to receive the extended end of a shaft 29 on which the guide frame swings from the position shown in Fig. 1 to the position shown in Fig. 5 and back again as will later appear; the shaft being mounted in the castings 10. In the preferred form of construction, the guide frame 22 normally inclines inwardly (see Fig. 1), the abutment 21 being positioned to arrest it at this inclination, so that the load carrying member (to be later described) may be operated to readily pick up a load and also transport it without danger of spilling it. In this arrangeemnt the shaft 29 is disposed inwardly a considerable distance so that the frame will quickly gravitate to the position shown in Fig. 5 upon the paying out of the cables 19a of the raising and lowering mechanism 19 as will later appear. Each guide channel is preferably provided at its upper end with an inwardly extending arm 30 arranged to engage the abutment 21 when the guide frame 22 swings inwardly. Each arm 30 is rigidly secured to the adjacent channel and it may carry an end wall 30a disposed in the plane of the free end of the adjacent tie rod 24 to form an engaging surface of relatively large area. The channels 22 are connected at their upper ends by a cross piece to insure their parallelism and simultaneous movements about the pivot 29. 31 indicates a load carrying member movable upwardly and downwardly on the guide frame 22 by the raising and lowering mechanism 19. The load carrying member 31 comprises a shoe portion 31a and a load supporting portion 31b; the former preferably consisting of pairs of plates 32 and connected by rods 33, 33a, the plates of each pair being disposed at either side of one of said guide channels 22a. 34 indicates upper and lower pairs of rollers mounted on the rods 33a, 33, respectively (one roller of each pair being disposed between each pair of plates 32), and engaging the front and rear sides of the guide channels 22 to slidably support the shoe thereon. The supporting portion 31b is of a shape best adapted to engage, hold and discharge the body or bodies to be handled, such as a plurality of forks. As I have illustrated the application of my invention to the handling of paper rolls A, the supporting portion 31b is curved on transverse lines, thus enabling its free transverse end, when the truck is driven toward the body, to be first readily projected underneath a roll and adjacent to its point of contact with its support and substantially below its center of gravity (see Fig. 5) and to then pick up the roll as the free end of the supporting portion 31b swings on an arc a (see dot and dash line—Fig. 5) about the pivot 29, due to the pull of the cables 19a on the upper end of the guide frame 22. In this movement of the supporting portion 31b, outward movement of the roll being prevented by the wall B or another roll A, or both, the free end of the supporting portion 31b, in traversing the arc a, will raise the roll and move to a point beyond its center of gravity, so that as the supporting portion swings to or approaches a horizontal position in swinging to the position shown in dotted lines in Fig. 5, the roll A will roll over onto the supporting portion 31b ready to be elevated or transported.

In engaging the load, the operative may, at his option drive the truck toward the body, thereby forcing it upwardly while projecting the supporting portion 31b to a greater or lesser extent beneath it or in some instances, after projecting the portion 31b partly below the load he may first partially tilt the guide frame and supporting portion and then drive the truck toward the load, or he may effect both operations simultaneously.

Figure 2:
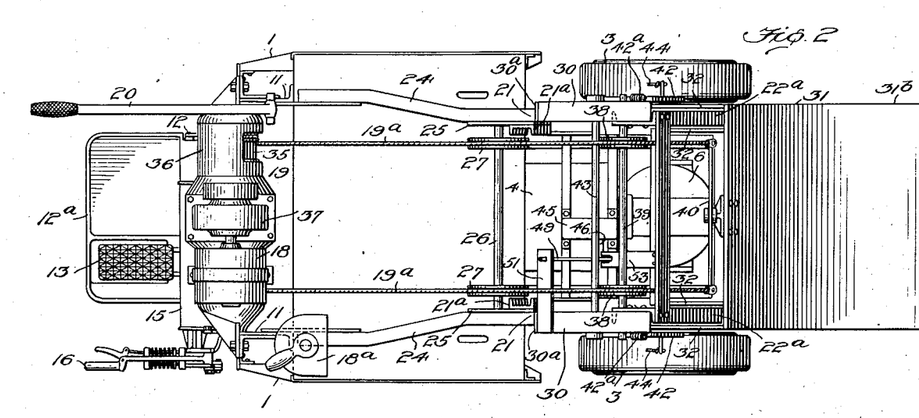
Fig. 2 is a plan view thereof.
Figure 3:
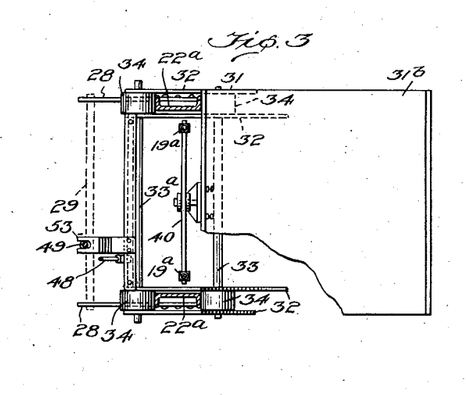
Fig. 3 is a fragmentary section on the line 3—3 of Fig. 1.

The raising and lowering mechanism 19 may comprise the following: 35 indicates a pair of drums (one being shown in Fig. 2) mounted within suitable housings 36 rigidly connected to a support which in turn is mounted on the uprights 11. The drums 35 are connected to a shaft or shafts also mounted in the housings 36 or the support, and operated by a suitable gear reduction (enclosed in a casing 37), which is driven by the motor 18, to simultaneously rotate the drums in either direction, the motor 18 being controlled by a suitable controller 18a. 19a indicates flexible members, such as cables (already referred to) arranged to wind on and off the drums. The cables 19a are guided by the sheaves 27 to suitable sheaves 38 loosely mounted on a shaft 39 which is supported by and extends between the upper ends of the guide channels 22a. From the sheaves 38 the cables extend downwardly and are connected in a suitable manner to the load carrying member 31, the free ends of the cables being preferably connected to the opposite ends of an equalizing bar 40, which is pivotally mounted on a bracket or support on the rear side of the supporting portion 31b.

Figure 1:
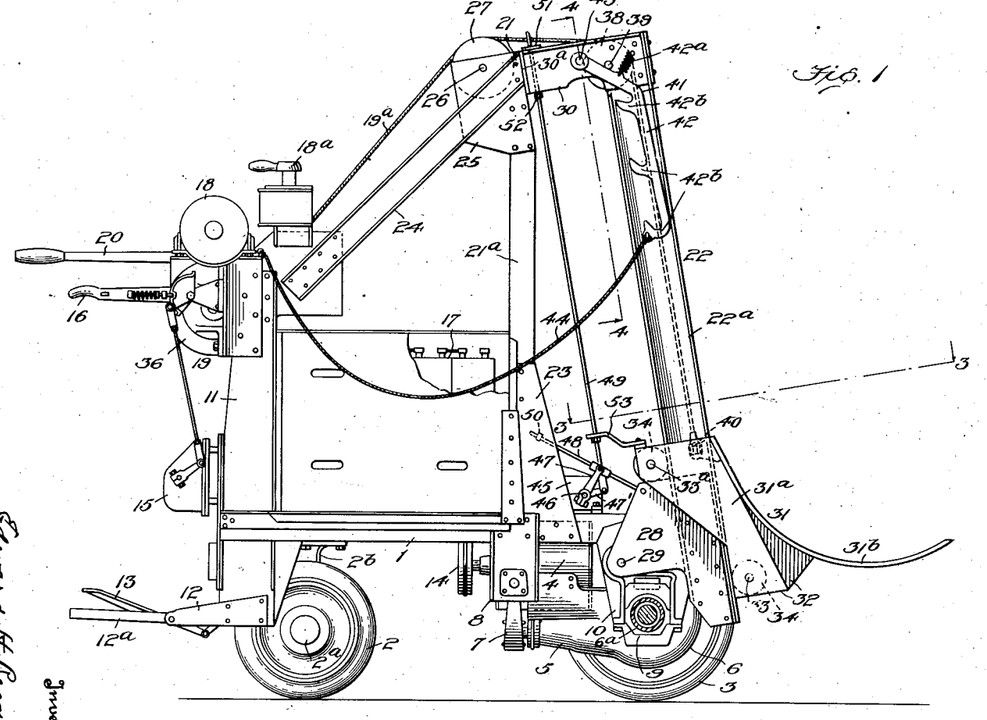
Fig. 1 is a side view of a truck embodying my invention, parts being broken away.
Figure 5:
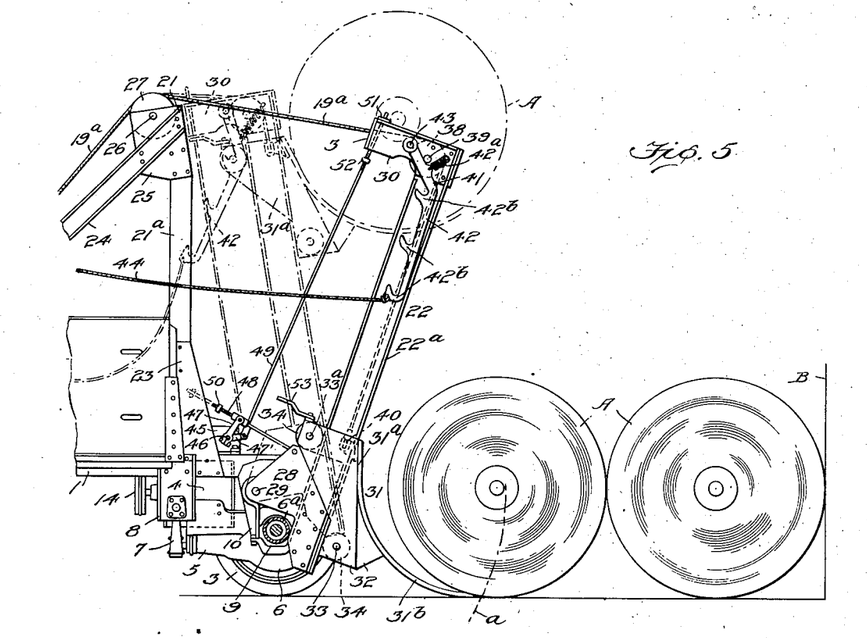
Fig. 5 is a view similar to Fig. 1, but showing the operation of picking up a body.

It will be understood from the foregoing description that the load carrying member 31 may be raised from the position shown in Fig. 1 to any height desired (see dotted lines in Fig. 5) by rotating the drums 35 to wind the cables 19a thereon and by rotating the drums in opposite direction the member 31 may be lowered; however, in the event that the load carrying member 31 is held against downward movement, or in its downward movement it is arrested or stopped, as for example, by the engagement of the upper rollers 34 with the plates 28 or by a stop intermediate its travel upwardly and downwardly on the guide frame 22, and the drums 35 are rotated to pay out the cables 19a, the weight of the guide frame 22 and load carrying member 31 will cause these parts to swing or tilt forwardly to the position shown in Fig. 5, such outward movement being preferably limited by the engagement of the lower ends of the guide channels 22a with the lateral tubular portions 6a of the housing 6. When these parts are utilized as the means to limit the outward movement of the guide frame, the pivot 29 is arranged as shown in the drawings, but in any event the limit means are arranged to hold the guide frame at such angle that the supporting portion 31b may be positioned at the angle most advantageous to insure ready projection thereof below the load to be picked up.

Figure 4:
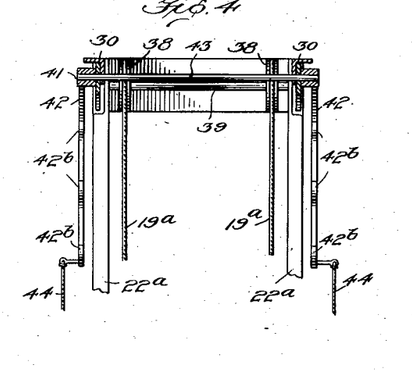
Fig. 4 is a fragmentary section on the line 4—4 of Fig. 1.

I provide means for engaging the load carrying member 31 and lock or hold it against downward movement, so that the paying out of the cables 19a will permit the guide frame 22 to swing or tilt forward either to dispose the supporting portion 31b in position for engaging a load that is to be picked up or to effect a discharge of the load. It will be understood that such means may be arranged at any position within the limits of travel of the load carrying member 31 or at either end of its travel or, as shown in the drawings, at a plurality of positions. For simplicity of construction, the engagement of the upper pair of rollers 34 with the plates 28 is utilized as the means to arrest and hold the load carrying member 31 at the end of its downward travel, whereby it and the guide frame may be tilted forwardly (see Fig. 5) to engage and pick up a load resting on the floor surface or on dunnage or to discharge a load thereon, whereas at the upper portion of the guide frame 22, I provide separate means 41 for locking or holding the load carrying member against downward movement, so that upon the paying out of the cables 19a the guide frame 22 and load holding portion 31b will swing forwardly to dispose the latter in position to engage a load resting on an elevated support or to discharge the load thereon. The means 41 comprise a hook 42 pivotally supported on the frame 22 and arranged to be moved into the path of some part of the load carrying member. In the preferred form of construction I provide two hooks 42 and mount them on the outer sides of the channels 22a, being secured in a well known manner to a rock shaft 43 rotatably mounted in and extending through aligned openings formed in the channels (see Fig. 4). The hooks 42 are normally biased to the position shown in Fig. 1 by a spring 42a, but when swung inwardly to the position shown in dotted lines in Fig. 5, the hook portions 42b of the hooks 42 will lie in the path of movement of the extended ends of the shaft 33a, so as to arrest the load carrying member in its downward movement, as will later appear. In the form of construction shown in Figs. 1 to 6, inclusive, the hooks 42 are swung into operating position manually by the operative pulling on a rope or cable 44, but in the form of construction shown in Figs. 7 to 13, inclusive, the hook 42' is operated and controlled automatically, as will later be set forth.

Figure 5A:
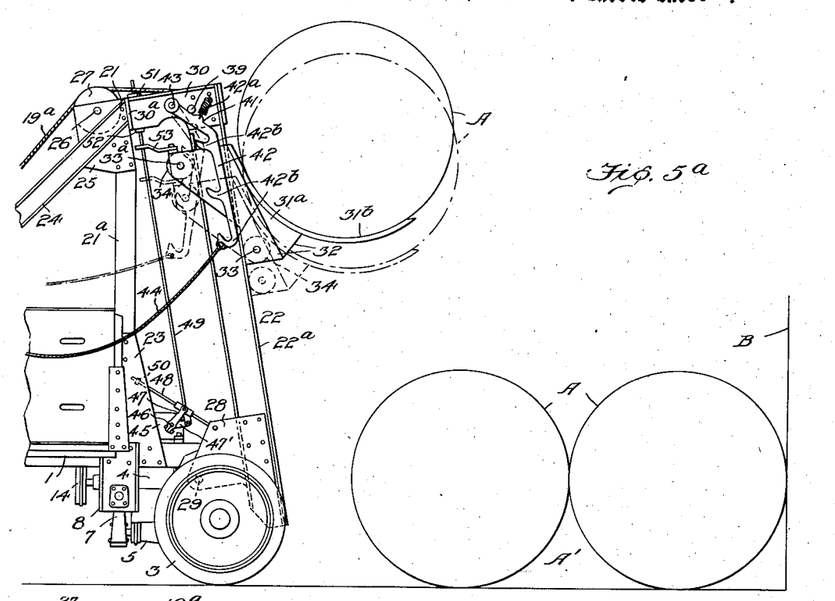
Fig. 5a is a fragmentary view showing the body raised to its upper position ready to be locked to the guide frame.
Figure 6:
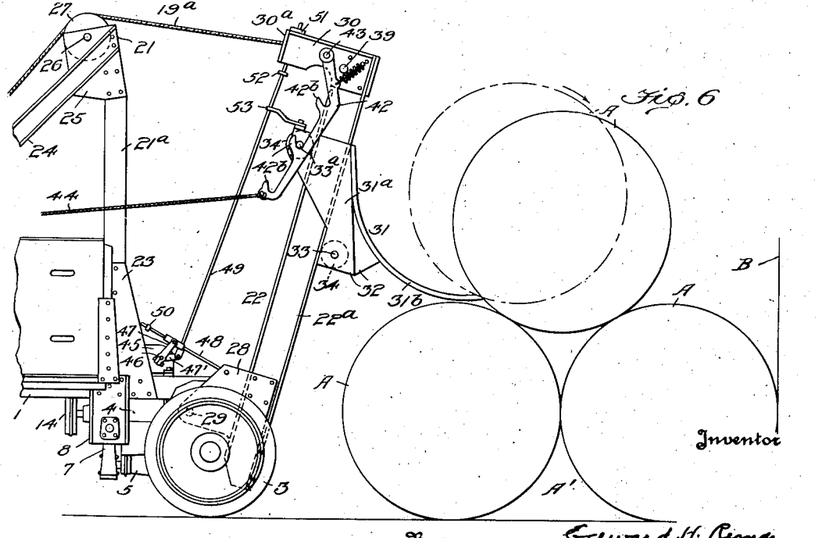
Fig. 6 is a fragmentary view similar to Fig. 5a showing the operation of discharging a body.
Figure 7:
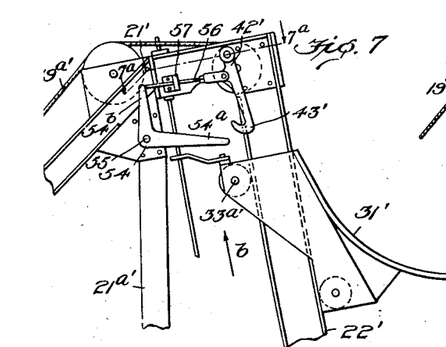
Figs. 7 to 13, inclusive, are fragmentary views showing an automatically operating means which lock the elevating member to the guide frame and release it therefrom in carrying out a complete operation of loading, transporting and discharging a body and the return of the elevating member to a position ready to engage another body.
Figure 7A:
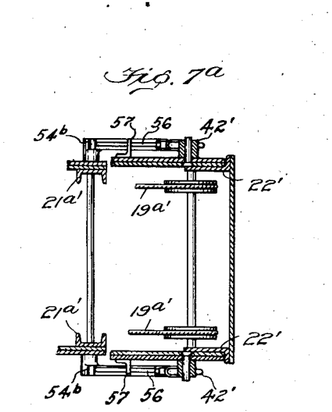
Figure 8:
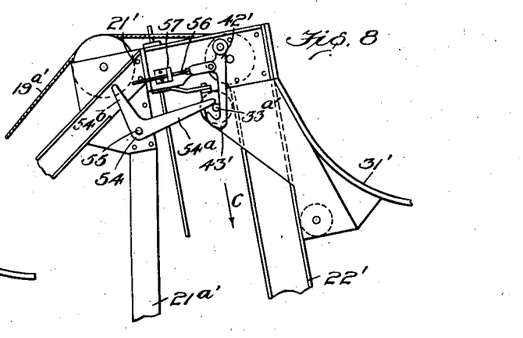
Figure 9:
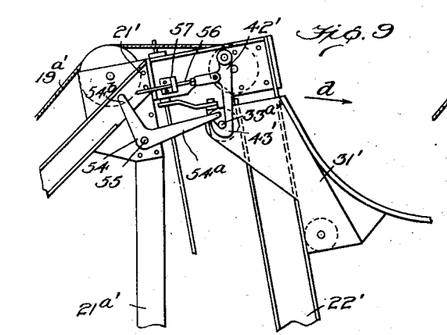
Figure 10:
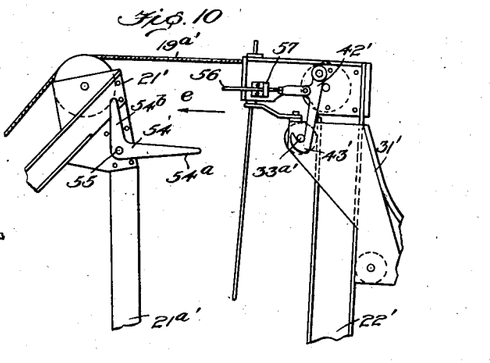
Figures 11, 12:
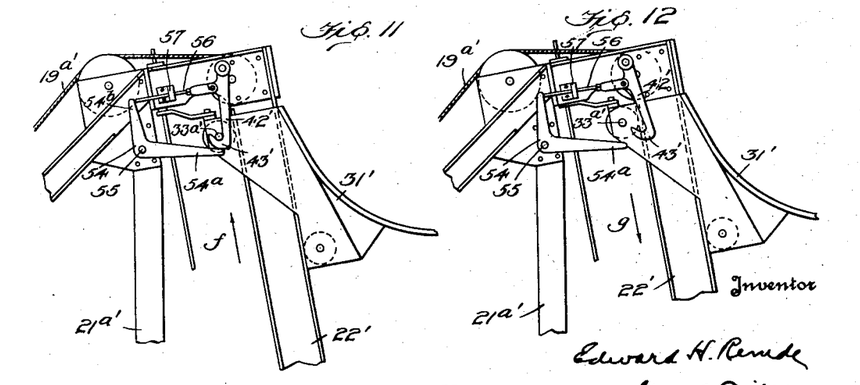

The operation of picking up and discharging a roll of paper A takes place as follows: With the load carrying member 31 and guide frame 2 in the position shown in Fig. 1, the cables 19a are payed out which permits these parts to swing or tilt to the position shown in Fig. 5; the truck is then driven to the position shown in this latter view, that is, with the load carrying portion 31b below and inwardly of the roll to a position adjacent its line of contact with the floor surface, the curvature of the load carrying portion and its position when tilted facilitating the engagement with and lifting or picking up operation of a load of the shape shown; next the drums 35 are rotated to wind up the cables 19a thereon; the pull of the cables incident to their winding first operates to swing the guide frame 22 inwardly against the abutment 21 and the free end of the member 31b along the arc a, thus effecting first a lifting of the roll A and then movement thereof over onto such member as this swinging movement continues; thereafter if the winding is continued the load carrying member will slide upwardly on the guide frame to any desired height. It will be understood that where the load is to be discharged on the floor surface or on dunnage, it is only necessary to tilt the parts inwardly, as just described, to then drive the truck to the place of discharge and then to pay out the cables 19a to tilt the guide frame 22 and load carrying member, the effect of which is to roll the roll A off the supporting portion 31b. But where the rolls are to be discharged upon an elevated level, for example, on top of a row A', of rolls A (see Figs. 5a and 6), the parts are operated as follows: After picking up a roll A and swinging the guide frame 22 inwardly against the abutment, the winding up of the cables 19a is continued; this operation raises the load carrying member 31 until the shaft 33a is above the desired hook portion 42b of the hooks 42 (see full lines in Fig. 5a), at which position the winding is stopped and by a pull on the rope 44 the hooks 42 are moved inwardly to the position shown in dotted lines in Fig. 5a, such movement being limited by the engagement of the body portion of the hooks with the shaft 33a; then the drums 35 are operated to unwind the cables 19a therefrom; as the unwinding takes place, the load carrying member first moves downwardly until the shaft 33a engages with the adjacent hook portion 42b, which arrests or locks the load carrying member 31 against further downward movement (see dotted lines in Fig. 5a), then as the unwinding of the cables continues the guide frame 22 and load carrying member 31 will swing outwardly to the position shown in Fig. 6, the effect of which operation is to cause the roll A to roll (or if the load is of some non-circular shape to slide) off the supporting portion 31b onto the row A' of rolls A. If now the cables 19a are wound on the drums, first the guide frame will swing inwardly against the abutment and then the load carrying member slides upwardly, thereby disengaging the adjacent hook portion 43b; the hooks 42 will then swing outwardly under the influence of the springs 42a, following which the load carrying member may be lowered or raised as may be desired.

As shown in Figs. 1 to 6, inclusive, I provide the hooks 42 with a plurality of hook portions 42b spaced from each other suitable distances according to the elevations of the supports on which the loads are to be discharged or from which they are to be picked up.

45 indicates a limit switch mechanism so related and connected to the guide frame 22 and load carrying member 31 that in the event (a) the former, for any reason swings beyond the limits of its movement, which in the present construction is limited by the engagement of the channels 22a with the axle members 6a in the outward direction and the abutment 21 in the inward direction, or (b) the latter is moved upwardly too far, the switch mechanism will open the circuit for the motor 18 and thus automatically stop the latter. The limit switch mechanism 45 is preferably of the construction shown in my co-pending application Ser. No. 610,791 (see Letters Patent 1,726,717), being enclosed in a suitable casing supported on the frame 1. The respective movable switch contacts of the switch mechanism are operated by a rock shaft 46, which carries two arms 47, 47'. The outer end of the arm 47 carries a member shaped to receive and hold a rotatable guide block in which is formed an opening forming a guide for the inner end of a rod 48 and the outer end of the arm 47' carries a pivot forming a connection for the lower end of a rod 49. The rod 48 is pivotally connected at its outer end to the adjacent plate 28 so as to be moved endwise thereby through the rotatable guide block, whereas its inner portion carries a tappet 50 adjustably secured thereto upon one side of the arm 47, so if the guide frame moves to an abnormal position, the tappet will engage and operate the arm 47 and thus open the motor circuit. The upper end of the rod 49 is slidably mounted in an opening formed in a bracket 51 extending inwardly from the upper end of one of the guide channels 22a and carries an adjustable tappet 52, which is engaged by a portion of the load carrying member 31 (for example, an arm 53 thereon). In the event of engagement of the arm 53 with the tappet 52, the rod 49 will be moved upwardly and it in turn will operate the switch 45 to open the circuit.

Figure 13:
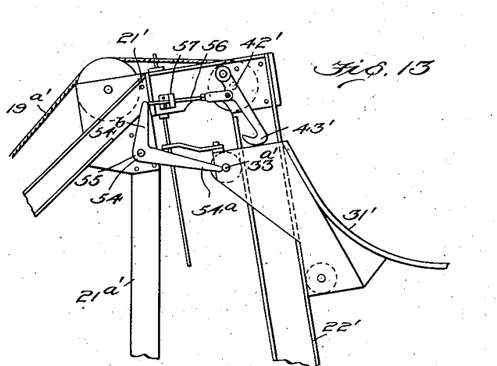

Referring to Figs. 7 to 13, inclusive, 22' indicates the guide frame, 21' indicates the abutment for limiting the inward swinging movement of the guide frame and 31'' indicates the load carrying member slidably mounted on the guide frame, these parts being similar in construction to like parts shown in Figs. 1 to 6, inclusive, and mounted on a wheeled frame, preferably of similar construction to that shown. 54 indicates a pair of bell cranks disposed on the outer sides of the abutment supporting channels 21a' and preferably secured to a rock shaft 54x 55 rotatably mounted in openings formed in these channels. The arms 54a of the bell cranks are weighted, as compared to their other arms 54b, and extend outwardly so as to lie in the path of movement of the outer ends of the shaft 33a' of the load carrying member 31'. 42' indicates a hook pivoted on the outer side of each guide frame channel 22a' and having a hook portion 43' arranged to receive the extended ends of the shaft 33a' and thereby lock or hold the load carrying member 31' against downward movement so that the frame 22' may tilt forward, upon the paying out of the cables 19a', as already set forth. 56 indicates a rod or thrust member pivoted at one end to each hook 42' and slidably supported at its other end in an opening formed in an angle member 57 so that its opposite or free end will be engaged by the bell crank arm 54b. When the load carrying member 31' is in a lowered position, the weighted arm 54a swings the arm 54b to the position shown in Fig. 7 and this latter arm in turn moves the rod 56 outwardly and the rod thus maintains the hook portions 43' out of the path of movement of the shaft 33a'. If the load carrying member is raised (see arrow b—Fig. 7), the shaft 33a' engages the arms 54a and swings the arms 54b inwardly; this allows the hooks 42' to swing into operative position (see Fig. 8); then if the cables 19a' are payed out to lower the member 31' (see arrow c—Fig. 8), the shaft 33a' will engage the hooks 43' (see Fig. 9) and further paying out of the cables 19a' will permit the frame 22' and member 31' to swing outwardly, as indicated by the arrow d in Fig. 9, to discharge the load. To return the load carrying member 31' to lowered position for engaging another load, the cables 19a' are wound on the drums, this operation serving to first swing the frame 22' inwardly (see arrow e—Fig. 10), against the abutment 21' (see Fig. 11) and to then raise the load carrying member 31' (see arrow f—Fig. 11). As soon as the hooks 42' are relieved of the weight of the member 31', the weight of the arms 54b will rock the bell cranks and thus through the thrust members 56 swing the hooks 42' to the position shown in Fig. 12, whereupon the load carrying member 31' may be lowered (see arrow g—Fig. 12), during which movement the bell cranks 54 will rock, as shown in Fig. 13 to permit the shaft 33a to ride past the arms 54a.

It will be understood that in the form of locking holding means shown in Figs. 7 to 13, inclusive, the load carrying member 31' is locked against movement downwardly and then released to permit of its downward movement entirely automatically by the operations of winding up and paying out the cables 19a', which operations are effected by the operation of the controller for the motor 18.

To those skilled in the art to which my invention relates many changes in construction and widely differing embodiments and applications of the invention will suggest themselves without departing from the spirit and scope thereof. My disclosures and the description herein are purely illustrative and art not intended to be in any sense limiting.

What I claim is:

1. In apparatus of the class described, the combination of a wheel mounted frame, a vertical guide frame swingably mounted at its lower end thereon to swing inwardly and outwardly relatively to its normal vertical plane, a load carrying member slidably mounted on said guide frame, means arranged above the pivot for said guide frame and adapted to be engaged by said load carrying member in its movement downwardly to arrest it against further downward movement, an abutment against which the guide frame is held in an inwardly inclined position during movement of said member upwardly and downwardly thereon, and operating means connected with said guide frame and load carrying member and arranged to swing said guide frame inwardly against said abutment when operated in a direction to raise said member, said operating means being arranged to hold said guide frame against said abutment during lowering of said member and permitting swinging of the guide frame outwardly when said member is arrested by said arresting means.

2. In apparatus of the class described, the combination of a wheel mounted frame, a vertical guide frame swingably mounted at its lower end thereon to swing inwardly and outwardly relative to its normal vertical plane, a load carrying member slidably mounted on said guide frame, means arranged above the pivot for said guide frame and adapted to be engaged by said load carrying member in its movement downwardly to arrest it against further downward movement, and operating means connected with said guide frame and load carrying member and arranged to swing said guide frame inwardly when operated in a direction to raise said load carrying member and to swing said guide frame outwardly when operated in a direction to lower said load carrying member, said operating means comprising a winding element, a flexible member arranged to wind on and unwind from said element and connected to said load carrying member and a guide member on the upper portion of said guide frame and around which said flexible member runs for connection with said load carrying member to slide it on said guide frame in either direction.

3. In apparatus of the class described, the combination of a wheel mounted frame, a substantially vertical guide frame pivoted at its lower portion on said frame and swingable inwardly and outwardly relative to its normal vertical plane, means for limiting the swinging of said guide frame in either direction, a load carrying member mounted to slide in opposite directions longitudinally of said guide frame, a winding and unwinding means including a flexible member reeved over a sheave mounted on the upper portion of said guide frame and connected to said load carrying member for raising and lowering the latter, said flexible member being arranged to swing said guide frame into an inwardly inclined position against said limiting means when operated to raise said load carrying member and to hold it in such position during lowering of said member, and means disposed above the pivot for said guide frame for arresting said member in its downward movement at a predetermined position and holding it against further downward movement, whereby the continued unwinding of said flexible member will permit said guide frame to swing outwardly.

4. In apparatus of the class described, the combination of a wheel mounted frame, a substantially vertical guide frame pivoted at its lower portion on said frame, and swingable inwardly and outwardly, means for limiting the swinging of said guide frame in either direction, a load carrying member mounted to slide in opposite directions longitudinally of said guide frame, a winding and unwinding means including a flexible member reeved over a sheave mounted on the upper portion of said guide frame and connected to said load carrying member for raising and lowering the latter, said flexible member being arranged to swing said guide frame inwardly when operated to raise said load carrying member and to permit it to swing outwardly when operated in the direction to lower said load carrying member after the latter is arrested, and means arranged at the upper portion of said guide frame for arresting said load carrying member in its downward movement and holding it against further downward movement, whereby continued unwinding of said flexible member will swing said guide frame outwardly.

5. In apparatus of the class described, the combination of a wheel mounted frame, a substantially vertical guide frame pivoted at its lower portion on said frame and swingable inwardly and outwardly relative to its normal vertical plane, means for limiting the swinging of said guide frame in either direction, a load carrying member mounted to slide in opposite directions longitudinally of said guide frame, a winding and unwinding means including a flexible member reeved over a sheave mounted on the upper portion of said guide frame and connected to said load carrying member for raising and lowering the latter, said flexible member being arranged to swing said guide frame into an inwardly inclined position against said limiting means when operated to raise said load carrying member and to hold it in such position during lowering of said member, and means disposed above the pivot for said guide frame for arresting the load carrying member at different predetermined positions in its downward movement and holding it against further downward movement, whereby the continued unwinding of said flexible member will permit said guide frame to swing outwardly.

6. In apparatus of the class described, the combination of a wheel mounted frame, a substantially vertical guide frame pivoted at its lower portion on said frame and swingable inwardly and outwardly relative to its normal vertical plane, means for limiting the swinging of said guide frame in either direction, a load carrying member mounted to slide in opposite directions longitudinally of said guide frame, a winding and unwinding means including a flexible member reeved over a sheave mounted on the upper portion of said guide frame and connected to said load carrying member for raising and lowering the latter, said flexible member being arranged to swing said guide frame into an inwardly inclined position against said limiting means when operated to raise said load carrying member and to hold it in such position during lowering of said member, and a device movably mounted on said guide frame above the pivot therefor and provided with a plurality of arresting elements each arranged in one position of said device to be disposed in the path of movement downwardly of said load carrying member to arrest it at a predetermined position and hold it against further downward movement, whereby the continued unwinding of said flexible member will permit said guide frame to swing outwardly.

7. In apparatus of the class described, the combination of a wheel mounted frame, a substantially vertical guide frame pivoted at its lower portion on said frame and swingable inwardly and outwardly relative to its normal vertical plane, means for limiting the swinging of said guide frame in either direction, a load carrying member mounted to slide in opposite directions longitudinally of said guide frame, a winding and unwinding means including a flexible member reeved over a sheave mounted on the upper portion of said guide frame and connected to said load carrying member for raising and lowering the latter, said flexible member being arranged to swing said guide frame into an inwardly inclined position against said limiting means when operated to raise said load carrying member and to hold it in such position during lowering of said member, a device movably mounted on said guide frame above the pivot therefor and arranged to be positioned in the path of movement of said load carrying member to arrest it in its downward movement and hold it against further downward movement, whereby the continued unwinding of said flexible member will permit said guide frame to swing outwardly, and means normally tending to maintain said device out of the path of movement of said load carrying member.

8. In apparatus of the class described, the combination of a wheel mounted frame, a guide frame normally disposed substantially vertically and pivoted at its lower portion on said frame, an abutment against which said guide frame rests when in normal position, a load carrying member mounted on said guide frame to slide from end to end thereof, operating means connected to said guide frame and said member and arranged to swing said frame inwardly when operating to raise said member and to swing said frame outwardly when operating in the opposite direction and said member is locked against downward movement, and means for automatically arresting said load carrying member at a predetermined position on said guide frame in its downward movement and holding it against further downward movement to permit tilting thereof and for releasing said member from said guide frame to permit it to slide thereon.

9. In apparatus of the class described, the combination of a wheel mounted frame, a guide frame normally disposed substantially vertically and pivoted at its lower portion on said frame to swing inwardly and outwardly relative to its normal vertical plane, an abutment against which said guide frame rests when in its inwardly inclined position, a load carrying member mounted on said guide frame to slide from end to end thereof, means disposed above the pivot for said guide frame for automatically arresting said load carrying member at a predetermined position on said guide frame in its downward movement and holding it against further downward movement to permit tilting thereof and for releasing said member from said guide frame to permit it to slide thereon, said arresting and releasing means being controlled by the raising and lowering of said member, and means for raising and lowering said load carrying member.

10. In apparatus of the class described, the combination of a wheel mounted frame, a guide frame normally disposed substantially vertically and pivoted at its lower portion on said frame, an abutment against which said guide frame rests when in normal position, a load carrying member mounted on said guide frame to slide from end to end thereof, means for automatically holding said load carrying member at a predetermined position on said guide frame to permit tilting thereof and for releasing said member from said guide frame to permit it to slide thereon, and means for raising and lowering said load carrying member, said means comprising a pivoted member having an engaging portion, a device having a portion normally disposed in the path of movement of said member and connections between said device and said pivoted member for controlling the operation of the latter.

11. In a power driven truck having a frame, a guide swingably mounted thereon, a load carrying member movable along said guide, a flexible member connected to said guide and member and arranged to swing the guide inwardly when operated to raise said member and to permit said guide to swing outwardly when said member is locked against downward movement, a device disposed above the pivot for said guide and movable into and out of operating position and arranged when in operating position to arrest said load carrying member in its downward movement and lock it against further downward movement, and means for holding said device out of operative position, said means including an arm normally disposed in the path of movement of said member and arranged to be operated by said load carrying member, when moving upwardly to permit said device to move into operating position and arrest said load carrying member in its downward movement.

12. In a power driven truck having a frame, a guide swingably mounted thereon, a load carrying member movable along said guide, a flexible member connected to said guide and member and arranged to swing the guide inwardly when operated to raise said member and to tilt it outwardly when said member is locked against downward movement, a device movable into and out of operating positon and arranged, when in operating position, to be engaged by and lock said load carrying member against downward movement, and means operated by said load carrying member, when moving upwardly to permit said device to move into operating position and arrest said load carrying member in its downward movement, said means including a movable member normally disposed in position to hold said device in its inoperative position, but operated by said load carrying member to move said device into operating position.

13. In a power driven truck having a frame, a guide swingably mounted thereon, a load carrying member movable along said guide, a flexible member connected to said guide and member and arranged to swing the guide inwardly when operated to raise said member and to tilt it outwardly when said member is locked against downward movement, a device movable into and out of operating position and arranged, when in operating position, to be engaged by and lock said load carrying member against downward movement, and means operated by said load carrying member, when moving upwardly to permit said device to move into operating position and arrest said load carrying member in its downward movement, said means including a movable member normally disposed in position to hold said device in its inoperative position, but operated by said load carrying member to move said device into operating position, and said movable member serving to automatically move said device into its inoperative position upon the raising of said load carrying member.

14. In a power driven truck having a frame, a guide swingably mounted thereon, a load carrying member movable along said guide, a flexible member connected to said guide and member and arranged to swing the guide inwardly when operated to raise said member and to tilt it outwardly when said member is locked against downward movement, a device movable into and out of operating position and arranged when in operating position to be engaged by and lock said load carrying member against downward movement, and means operating automatically, upon the return of said guide to its inner position, to move said device to its inoperative position upon the raising of said load carrying member.

15. In apparatus of the class described, the combination of a wheel mounted frame, a substantially vertical guide frame pivoted at its lower portion on said frame, and swingable inwardly and outwardly, means for limiting the swinging of said guide frame in either direction, a load carrying member mounted to slide in opposite directions longitudinally of said guide frame, a winding and unwinding means including a flexible member reeved over a sheave mounted on the upper portion of said guide frame and connected to said member, a device movably mounted on said guide frame and provided with a plurality of holding portions, and means normally tending to maintain said device out of the path of movement of said load carrying member along said guide frame, said device being movable to position one of said holding portions in the path of movement of said member, whereby the unwinding of said cable will first cause engagement of said member with one of said holding portions and then swing said guide frame outwardly.

16. In a power driven truck having a frame, a substantially vertical guide mounted thereon, a load carrying member movable upwardly and downwardly along said guide, means for raising and lowering said member, a device movable into and out of operating position and arranged when in operating position to be engaged by and lock said member against downward movement at a predetermined position intermediate its travel along said guide, and means operating automatically upon the raising of said load carrying member to move said device to and hold it in its inoperative position, whereby said member may be lowered to a position below its locking position.

17. In a power driven truck having a frame, a substantially vertical guide mounted thereon, a load carrying member slidably mounted on said guide to move upwardly and downwardly thereon, means for raising and lowering said member, a device movable into and out of operative position and arranged when in operating position to be engaged by and lock said load carrying member against downward movement at a predetermined position intermediate its ends of travel, and means operated by said load carrying member, when moving upwardly, to permit said device to move into operating position and arrest said load carrying member, said means including a movable member normally disposed in position to hold said device in its inoperative position, but arranged to be operated by said load carrying member to permit said device to move into operating position, and said movable member serving to automatically move said device into its inoperative position upon the raising of said load carrying member.

In testimony whereof I have hereunto subscribed my name.

EDWARD H. REMDE.